July 2, 1935.  W. A. SMITH, SR  2,006,845

ROCK DRILL

Filed June 25, 1929

INVENTOR.
William A. Smith Sr.
BY
HIS ATTORNEY.

Patented July 2, 1935

2,006,845

UNITED STATES PATENT OFFICE 2,006,845

ROCK DRILL

William A. Smith, Sr., Easton, Pa., assignor to Ingersoll-Rand Company, Jersey City, N. J., a corporation of New Jersey Application June 25, 1929, Serial No. 373,644

6 Claims. (Cl. 308—3)

This invention relates to rock drills, but more particularly to a front end construction for rock drills of the hammer type.

One object of the invention is to enable the same rock drill to be used for actuating either a drill steel or a broaching steel and to permit the substitution of chuck parts adapted for the steels used in the several operations without requiring the complete dismantling of the rock drill.

Other objects will be in part obvious and in part pointed out hereinafter.

Figure 2:
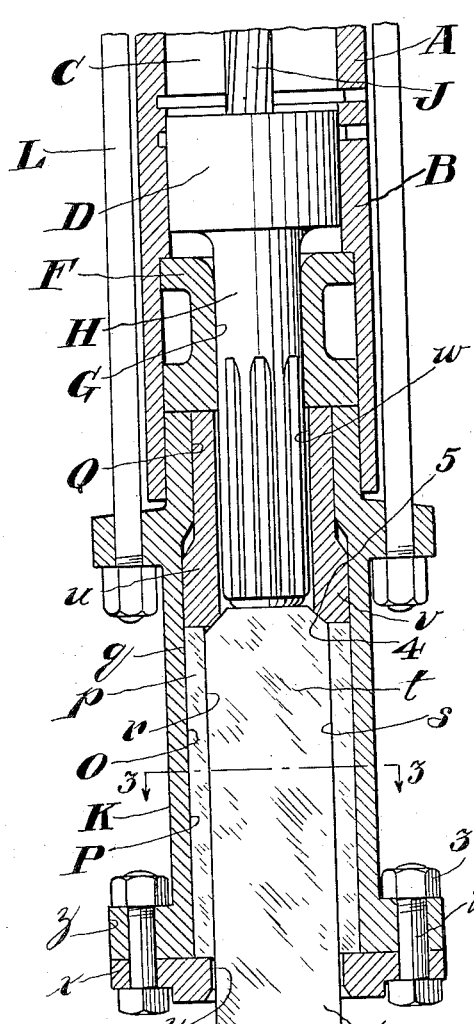
Figure 3:
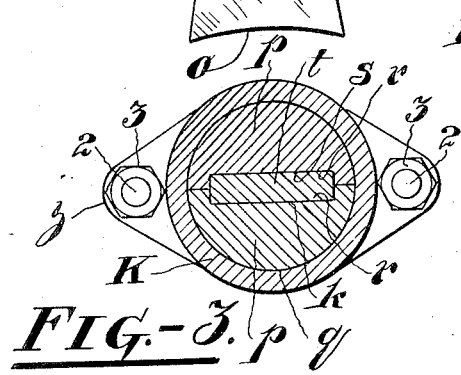
Figure 1:
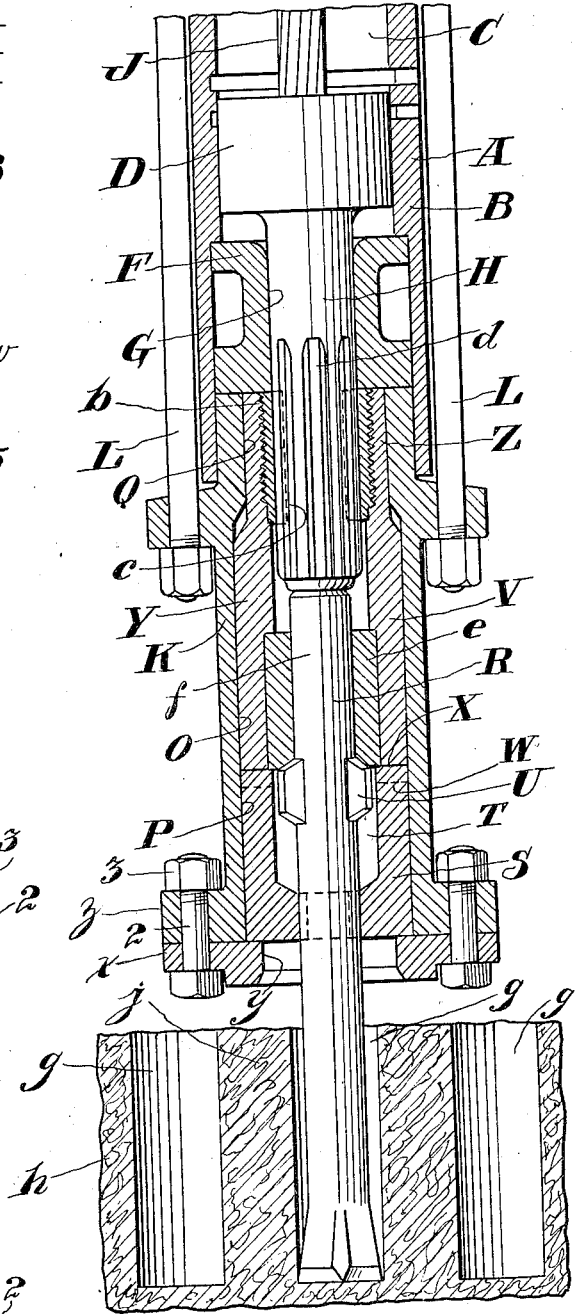

In the accompanying drawing illustrating one form which the invention may assume in practice and in which similar reference characters refer to similar parts, Figure 1 is a longitudinal sectional elevation of the front end portion of a rock drill illustrating a front head constructed in accordance with the practice of the invention and chuck parts in the front head adapted to accommodate a drill steel, Figure 2 is a view similar to Figure 1 showing the front head equipped with chuck parts adapted to accommodate a broaching steel, and Figure 3 is a transverse view taken through Figure 2 on the line 3—3 looking in the direction indicated by the arrows.

Referring to the drawing, A designates a rock drill comprising a cylinder B, only the front end of which is shown, and having a piston chamber C in which is disposed a reciprocatory hammer piston D. A front cylinder washer F forms a closure for the front end of the piston chamber C and is provided with a bore G which acts as a guide for an extension H carried by the piston D.

Suitable rotation mechansim for the piston D is indicated at J as a rifle bar which may be interlocked slidably with the piston D in a well known manner and which bar may be provided with known means (not shown) for imparting a step-by-step rotary movement to the piston preparatory to the delivery of each blow of the piston against a working implement intended to be actuated.

The rock drill A is provided with a front head K which may extend into the front end of the cylinder B to bear against the forward end of the front cylinder washer F and may be clamped in operative position to the cylinder in any suitable manner, as for instance, by side bolts L.

The front head K constructed in accordance with the practice of the invention has a bore O which extends entirely therethrough and comprises a forward enlarged portion P and a reduced rearward portion Q.

Whenever it is intended to use the drill A for actuating a drill steel, such as that designated by R, the front head K may serve as a housing for chuck mechanism comprising a chuck driver S having ribs T therein for engagement with lugs U carried by the drill steel R to transmit the rotary movement of the chuck driver to the drill steel.

The chuck driver S may be suitably interlocked with a chuck V disposed rearwardly of the chuck driver and having clutch members W adapted to engage corresponding clutch members X of the chuck driver S. The chuck V has a forward enlarged portion Y which lies within the enlarged portion P of the bore O and has a rearward reduced extension Z adapted to rotate in the reduced portion Q of the bore.

In the rearward end of the chuck V is threaded a chuck nut $b$ having the usual ribs $c$ to interlockingly engage flutes $d$ of the piston extension H. In the forward end of the chuck V is disposed a chuck bushing $e$ through which extends the shank $f$ of the drill steel R to receive the blows of the hammer piston D.

The chuck parts described in connection with Figure 1 are those wherewith the drill may be equipped when using it for actuating a drill steel and in which it is essential that the drill steel be constantly rotated in the drill hole, such as the holes $g$ in rock $h$.

As will be observed the holes $g$ are spaced reltatively close to each other thus leaving intervening walls $j$ of rock which may be removed in a subsequent broaching operation. This method of cutting rock is common practice and has been found to be highly desirable for removing rock in the form of blocks or slabs from the mass.

As has been hereinbefore indicated, rotary movement of the chuck mechanism is desirable only for drilling the holes $g$. Such rotary movement however, is not required when using the drill for broaching the walls $j$ between adjacent holes. It has been proposed heretofore to use broaching steels having shanks of the same conformation as that of the drill steel R but to omit the lugs U so that the position of the broaching tool will not be affected by the rotary movement of the chuck mechanism. In using a broaching tool thus constructed however, it is a difficult matter to entirely prevent the transmission of some rotary movement to the broaching steel and, at best, the broaching steel will, by bearing against the chuck parts, create a drag thereon which tends to retard the movement of the hammer piston. Another disadvantageous feature of a broaching steel thus constructed is that it is not only expensive to manufacture but is practically incapable of withstanding the severe usage to which it is subjected. The present invention contemplates the use of broaching steels of substantially the same cross sectional area throughout its length such as that indicated by k in Figure 2. The broaching steel k may be provided at its front end with the usual concave cutting surface o which is adapted to span the walls j.

The chuck mechanism provided for the accommodation of a broaching steel, such as that illustrated, comprises in this instance a pair of half sections or symmetrical members p having outer cylindrical surfaces q which bear against the wall of the bore O and have grooves r in their adjacent surfaces to form a rectangular guideway s for the rearward end or shank t of the broaching steel k. The members p preferably lie entirely within the enlarged portion P of the bore O and abut with their rearward ends a chuck bushing u which is disposed in the reduced portion q of the bore and which in turn abuts with its rearward end against the forward surface of the front cylinder washer F.

The chuck bushing u has a forward enlarged portion v which lies within the enlarged portion P of the bore O, and in said chuck bushing is formed a bore w through which may reciprocate the extension H of the piston D to deliver its blow against the end of the broaching steel k.

Both the members p and the chuck bushing u may be freely rotatable within the bore O so that the cutting bit of the broaching steel k may readily adjust itself to the most suitable position with respect to the work. As will be observed however, the piston D is in no wise interlocked with the chuck parts although it is free to rotate in the usual manner. Therefore no rotary movement of the piston will be imparted to the chuck mechanism used for guiding the broaching steel k.

In order to retain the chuck mechanisms illustrated in Figures 1 and 2 in the front head K, a plate x is disposed at the front end of the front head to form a seat for the members p or for the chuck driver S, as the case may be. The plate x is provided with a bore y of sufficient area to permit the broaching steel k to extend therethrough and is in this instance secured to lugs z at the front end of the front head K by means of bolts 2 having nuts 3 threaded thereon.

The width of the grooves r in the members p is preferably somewhat greater than the diameter of the bore w so that a portion of the forward end surface of the chuck bushing u overlaps the sides of the guideway s. In this way the chuck bushing u may also serve as an abutment for the rearward end of the broaching steel k.

As a preferred form of construction the chuck bushing u is provided at the forward end of the bore w with a tapered surface 4 against which seat inclined surfaces 5 of the broaching steel k.

The present invention is particularly desirable for use in broaching rock since it enables the same drill to be used both for drilling the drill holes and also for broaching the walls of rock between the drill holes. This is obviously of great advantage since it not only eliminates the necessity of providing a plurality of drills to carry out both operations but it also entirely eliminates breakage of the broaching steel shank since it enables the use of a broaching steel having a shank of substantially the same conformation as the body portion of the steel. The broaching steel is therefore capable of fully withstanding the strains to which it may be subjected.

In practice the drill may be equipped with the chuck mechanism illustrated in Figure 1 for the accommodation of a lugged drill steel of the Leyner type, such as that shown by R, for drilling the holes g in the rock h. After the line of holes have been drilled the plate x may be removed from the front head. The chuck jaw S and the chuck V may then be removed from the bore O and the members p and the chuck bushing u may be substituted therefor for the accommodation of the broaching tool k. In both forms of assembly the plate x will serve as a seat for retaining the chuck mechanism within the front head.

I claim:

1. In a rock drill, the combination of a cylinder and a front head having a bore therethrough, said bore comprising a forward enlarged portion and a rearward reduced portion, means extending rearwardly from the rear end of the front head to secure the cylinder and the front head together, a chuck disposed loosely in the enlarged portion and comprising a pair of half sections having longitudinal grooves in their adjacent surfaces to form a rectangular guideway for the reception of a working implement, a chuck bushing in the reduced portion forming an abutment for the chuck, a plate at the front end of the front head to form a seat for the front end of the chuck, and means extending through the plate and the front end of the front head for securing the plate to the front head.

2. In a rock drill, the combination of a cylinder and a front head having a bore therethrough, said bore comprising a forward enlarged portion and a rearward reduced portion, means extending rearwardly from the rear end of the front head to secure the cylinder and the front head together, a pair of symmetrical members freely rotatable in the enlarged portion and having longitudinally extending grooves in their adjacent surfaces to form a rectangular guideway for a working implement, a chuck bushing in the reduced portion of the bore forming an abutment for the members, a plate positioned on the front end of the front head to retain the members and the chuck bushing in the front head, and means extending through the plate and the front end of the front head to secure the plate in position.

3. In a rock drill, the combination of a cylinder and a front head having a bore opening from the front end thereof, means to secure the cylinder and the front head together, a chuck disposed loosely in the bore and inserted from the front end thereof, said chuck having a uniform cylindrical peripheral surface extending throughout its length and bearing against the walls of the bore, guideways in said chuck to receive a working implement, a plate positioned on the front end of the front head and overlying the forward extremity of the chuck to retain the chuck within the front head, and means extending through the plate and the front end of the front head to secure the plate in position.

4. In a rock drill, the combination of a cylinder and a front head having a bore opening from the front end thereof, means extending rearwardly from the rear end of the front head to secure the cylinder and the front head together, a chuck disposed loosely in the bore and inserted from the front end thereof, said chuck having a uniform cylindrical peripheral surface extending throughout its length and bearing against the walls of the bore, said chuck comprising a pair of members having registering grooves in their adjacent surfaces to form a rectangular guideway for the reception of a working implement, a plate positioned in the front end of the front head and overlying the forward extremity of the chuck to retain the chuck within the front head, and means extending through the plate and the front end of the front head to secure the plate in position.

5. In a percussive tool having an impact element, the combination of a front head therefor having a bore therethrough, a cylindrical chuck element disposed loosely in the bore, said element having a rectangular slot to receive the shank of a broaching steel and permit it to project into the bore in position to receive the blows of the impact element, and means to retain the chuck element in the front head.

6. In a percussive tool having an impact element, the combination of a front head therefor, having a bore therethrough, a cylindrical chuck element disposed loosely in the bore, said element having an opening therethrough to receive the shank of a working implement and permit it to project into the bore in position to receive the blows of the impact element, and means to retain the chuck element in the front head.

WILLIAM A. SMITH, Sr.